United States Patent [19]
Hartl et al.

[11] Patent Number: 5,457,756
[45] Date of Patent: Oct. 10, 1995

[54] FIBER-OPTIC DEPOLARIZER

[75] Inventors: Engelbert Hartl, München; Reinhard Müller, Puchheim; Hans Poisel, Leinburg, all of Germany

[73] Assignee: Deutsche Aerospace AG, Germany

[21] Appl. No.: 89,828

[22] Filed: Jul. 12, 1993

[30] Foreign Application Priority Data

Jul. 10, 1992 [DE] Germany .................... 42 22 658.9

[51] Int. Cl.⁶ ..................................................... G02B 6/26
[52] U.S. Cl. ................................................. 385/11; 385/96
[58] Field of Search ................................... 385/11, 1, 12, 385/15, 24, 27, 31, 43, 96, 95, 51

[56] References Cited

U.S. PATENT DOCUMENTS

| | | | |
|---|---|---|---|
| 4,641,914 | 2/1987 | Sheem | 385/95 |
| 4,801,185 | 1/1989 | Bricheno | 385/43 |
| 5,187,757 | 2/1993 | Ohno et al. | 385/11 |

FOREIGN PATENT DOCUMENTS

| | | | |
|---|---|---|---|
| 2683052 | 4/1993 | France | 385/11 |
| 3101577 | 8/1982 | Germany | 385/96 |
| 54-6567 | 1/1979 | Japan | 385/43 |
| 56-15758 | 2/1979 | Japan | 385/43 |
| 59-57211 | 4/1984 | Japan | 385/96 |
| 1541787 | 3/1979 | United Kingdom | 385/43 |

OTHER PUBLICATIONS

Ulrich et al.; "Single–mode fiber–optical polarization rotator"; Applied Optics, vol. 18, No. 11, Jun. 79, pp. 1857–1861.

Varnham et al; "Polarimetric Strain Gauges Using High Birefringence Fiber"; Electronics Letters, Aug. 1983, vol. 19, No. 17 pp. 699–700.

*Primary Examiner*—Rodney B. Bovernick
*Assistant Examiner*—John Ngo
*Attorney, Agent, or Firm*—Evenson, McKeown, Edwards & Lenahan

[57] ABSTRACT

A process for the manufacturing a fiber optic depolarizer as well as an arrangement of that type uses two optical fiber sections which obtain the polarization planes of the light and which are connected with one another in such a manner that the principal axes of the optical fiber sections enclose an angle of 45°. An optical fiber piece which obtains no polarization is inserted between the optical fiber sections whose principal axes enclose an angle of 45°, in that the optical fiber sections and the optical fiber piece are fixed to one another at their connecting areas. The principal axis orientations of the optical fiber sections are adjusted in such a manner that, in the case of a firm positioning of one of the two connecting areas by the torsional twisting of the other connecting area, an angle of 45° is adjusted.

17 Claims, 2 Drawing Sheets

FIBER-OPTIC DEPOLARIZER

BACKGROUND AND SUMMARY OF THE INVENTION

This invention relates to a fiber-optic depolarizer and a material for making the depolarizer which comprises two polarization maintaining linearly birefringent optical fiber sections connected with one another in such a manner that the main axes of the optical fiber sections form an angle of 45°.

Optical fibers are of special interest in the field of optical communication systems or other fields such as interferometric sensor technology. Optical communication systems normally consist of a light source and a photodetector which are connected with one another by way of optical fibers. In addition, depending on the application of the optical system, optical components which change the propagation characteristics of the light may also be integrated within the light path along the optical fiber.

Such components may, for example, be polarizers which influence the plane of polarization of the electromagnetic wave propagating in the optical fiber and contribute to the modulation of the light signals. In addition, wavelength-selective filter systems are known, such as Lyot filters or similar filters, which are described in detail in the U.S. Pat. No. 4,606,605.

Depolarizers, which convert polarized light into nonpolarized light, play an important role in the field of interferometric sensor technology. Thus, depolarizers are required for faultless operation of fiber-optic gyro systems which have an optical coil arrangement and, for reasons of expenditures, preferably are made of non-polarization maintaining (NPM) optical-fiber material. In particular, depolarizers are used for the cancellation of such interfering signals in order to suppress so-called gyro error signals which statistically arise in conjunction with the different polarization conditions of individual light wave trains within the fiber-optic. Depolarizers make it possible to manufacture fiber-optic systems from NPM optical fiber materials which are considerably less expensive than those made of polarization-maintaining (PM) optical fibers.

Known fiber-optic depolarizers consist of two PM optical fiber sections which are connected with one another in such a manner that their main axes (the axes of maintaining linear polarization) form an angle of 45°. The performance of the depolarizer depends upon how close the angle is to 45°.

During the manufacturing of depolarizers, special attention is given to the main axes of the two optical fibers, which are to be guided together in the desired orientation with respect to one another. Once the angle formed by the main axes of the fibers equals 45°, the fiber ends can be firmly connected with one another. The fiber ends are heated to their melting temperature and are subsequently connected in a firm manner. This type of connection of two optical fibers is called "splicing".

The tensions which are contained in the fibers in the cold condition can relax during the process as a result of the heating and expansion of the material which can rotate the main axes so that the angle formed thereby is different than that formed by the main axes in the cold condition. Therefore, the rotation of the main axes occurs during the splicing of fibers, the birefringence of which is based on mechanical tensions which have arisen during the manufacturing operation.

Such tensions do not occur in a uniformly distributed manner along the cross-section of the fiber. Spliced connections of PM fibers having an angle of 45° between the main axes are affected because the tensions in the front faces to be spliced act in respectively different portions of the cross-sections. The deviations from the 45° angle can no longer be corrected by means of the described process after the splicing operation and therefore the depolarizer cannot reach its optimal quality.

It is an object of the invention to provide a process for the manufacturing of a fiber-optic depolarizer as well as a fiber-optic depolarizer which consists of two PM optical fiber sections connected with one another in such a manner that the main axes of the optical fiber sections form an angle of 45° so that, during the manufacturing, interfering displacements of the main axes are largely avoided and slight position corrections of the main axes are permitted after the splicing operation for a very precise adaptation to the main axis position. In particular, the depolarizer according to the invention has the purpose of permitting optimization of the angle formed by the main axes after the joining of the individual optical fiber sections.

According to the invention, two polarized optical fibers are aligned with respect to one another in such a manner that their main axes enclose an angle of 45° and an NPM optical fiber piece is inserted between the optical fiber sections. In certain exemplary embodiments, the optical fibers are firmly connected with one another using thermal splices.

According further to the present invention, the optical fiber sections can be glued to a base using a bonding agent. A small tube can be provided over the connected area of the optical fiber sections. The tube can be in two sections and can be made of metal or glass.

According further to the present invention, the lengths of the optical fiber sections of a fiber-optic depolarizer are indicated by L1>LD and L3>LD and |L1−L3|>LD with LD=LC*LB/λ, wherein LD is the depolarization length, LC is the coherence length, LB is the beat length, and λ is the center wave length of the light transmitted by means of the fiber arrangement.

An advantage of the process according to the invention is the fact that the NPM fiber piece contains no or very low mechanical tensions. The splicing therefore becomes less critical. Another advantage is that the precise adjusting of the depolarizer may take place after the splicing of the three fiber sections wherein one spliced connection is held while the other spliced connection is torsionally twisted. The twisting takes place until the angle between main axes is 45°. The 45° angle can be measured by, for example, measuring residual polarization behind the polarizer.

The precise adjusting of the 45° angle after the splicing is based on the fact that the light in high berefringent fibers, thus in the PM optical fiber sections, follows the twisted main axes, but not in the low birefringent fibers, as, for example, in the optical fibers which do not maintain any polarization. See, in this respect: R. Ulrich, A. Simon: "Polarisation Optics of Twisted Single Mode Fibres", *Applied Optics*, Vol. 18, 1979, Pages 2241 to 2251.

Other objects, advantages and, novel features of the present invention will become apparent from the following detailed description of the invention when considered in conjunction with the accompanying drawings.

DETAILED DESCRIPTION OF THE DRAWINGS

Figure 1:
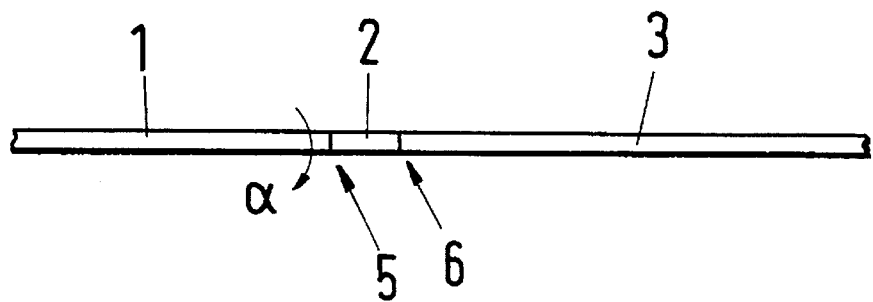
FIG. 1 is a view of an optical fiber arrangement according to the invention.

FIG. 1 illustrates a fiber-optic depolarizer according to the invention which comprises PM optical fiber sections 1 and 3 which are connected via an NPM optical fiber piece 2. During manufacture, the spliced points or the connected areas 5, 6 are connected with one another by means of thermal splicing. Possible small deviations from the 45° adjustment of the main axes of the optical fiber sections 1 and 3 may be corrected by a subsequent twisting.

For this purpose, the spliced point or the connected area 6 of optical fibers 2 and 3 may be held and the spliced point or the connecting area 5 of optical fibers 1 and 2 may be twisted about an angle until the main axes of fibers 1 and 3 form a 45° angle. In this case, fibers 1 and 2 are slightly twisted.

When, for example, linearly polarized light is beamed into a main axis of the fiber 1, when the connecting point 5 is rotated by the angle, this light is rotated along with it. In the NPM optical fiber 2, which is twisted in the opposite direction of optical fiber 1, this light is no longer rotated back by the angle but only by a small part of that angle.

Figure 2:
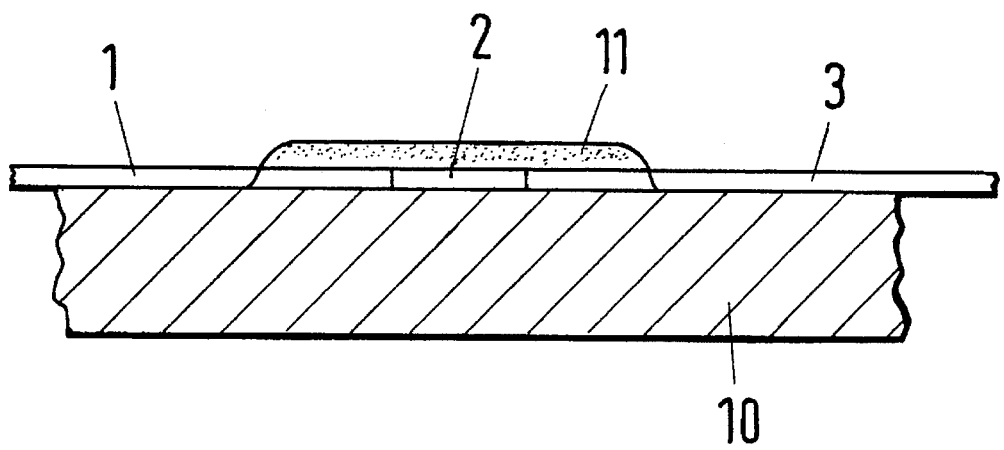
FIG. 2 is a view of a conglutinated optical fiber arrangement according to the invention.
Figure 3A:
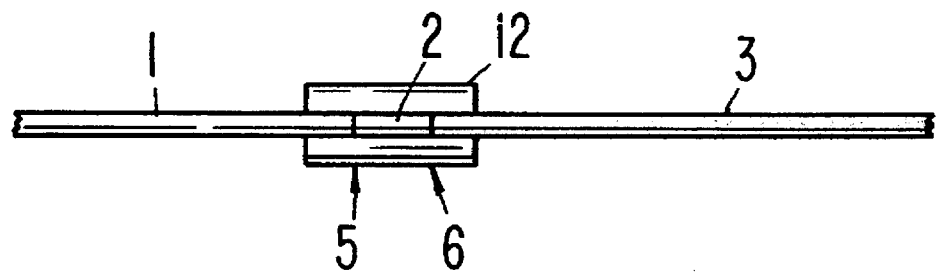
FIG. 3a is a view of an optical fiber arrangement using a small tube according to an embodiment of the present invention.
Figure 3B:
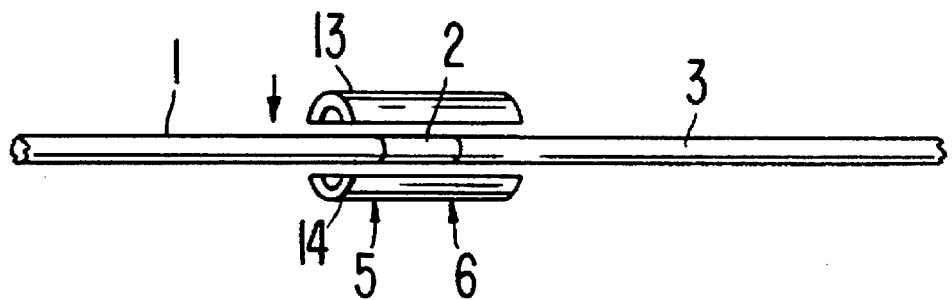
FIG. 3b is a view of an optical fiber arrangement using two small semitubes according to an embodiment of the present invention.

Since the twisting of optical fiber 2 and thus the 45° angle between the main axes 1 and 3 must be maintained, the spliced points or the connecting areas 5 and 6 have to be fixed. According to FIG. 2, the optical fibers are glued on a base by means of a bonding agent 11. A particularly stable arrangement is obtained when the optical fiber areas which represent the depolarizer are glued into a small metal or glass tube 12, as shown in FIG. 3a. Another possibility consists of two small semitubes 13, 14 into which the fibers may be glued, as shown in FIG. 3b.

The lengths of the three optical fiber pieces which form the depolarizer in the described combination are composed according to the following criteria:

The respective lengths L1 and L3 of the optical fiber pieces 1 and 3 as well as the absolute difference |L1–L3| is larger than the depolarization length LD. In contrast, the depolarization length depends on the coherence length LC and the center wave length, $\lambda$, of the light source and the beat length LB of the PM fiber.

The coherence length, LC, is a term familiar to one of ordinary skill in the art. It can be derived by examining the interference pattern made by an original beam and a divergent beam, where the divergent beam has a different path length than the original beam. The path difference at which the amplitude of the interference pattern has decreased by 1/e (e=2.718 . . . ) is the coherence length. The beat length, LB, a term also known to one of ordinary skill in the art, is a measure of the length after which a wave in the slow axis of a linearly birefringent fiber is delayed by exactly one optical wavelength compared with a wave in the fast axis.

The depolarization length, LD, is defined by the following formula:

$$LD=LC*LB/\lambda.$$

In contrast, optical fiber 2 is a relatively short piece which measures only millimeters or centimeters, for example 1 mm through 3 cm.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A process for manufacturing a fiber-optic depolarizer having two polarization-maintaining linearly birefringement optical fiber sections connected with one another so that main axes of the optical fiber sections are displaced by an angle of 45°, comprising the steps of:

inserting a nonpolarization-maintaining optical fiber piece between the optical fiber sections whose main axes displaced by an angle of 45°;

connecting the optical fiber sections and the optical fiber piece at connecting area;

adjusting the main axes of the optical fiber sections by a firm positioning of one of two connecting areas and by torsional twisting of the other connecting area until the angle of 45° exists between the main axes of the optical fiber sections.

2. A process according to claim 1, wherein connecting the individual optical fibers is performed using thermal splicing.

3. A process according to claim 2, wherein after the twisting of the optical fibers, the relative position of the connection areas is fixed.

4. A process according to claim 3, wherein the optical fiber sections are glued, using a bonding agent, in the area of the connections areas on a base.

5. A process according to claim 3, wherein the optical fiber sections are covered in the area of the connecting sections with a small tube which are glued together with the optical fiber sections.

6. A process according to claim 5, wherein adjusting of the main axis orientations is controlled to an angle of 45° by measuring residual polarization behind a depolarizer.

7. A process according to claim 3, wherein the optical fiber sections are covered in the area of the connecting sections with two semitubes which is glued together with the optical fiber sections.

8. A process according to claim 7, wherein adjusting of the main axis orientations is controlled to an angle of 45° by measuring residual polarization behind a depolarizer.

9. A process according to claim 1, wherein adjusting of the main axis orientations is controlled by measuring residual polarization behind a depolarizer.

10. A process according to claim 1, wherein after the twisting of the optical fibers, the relative position of the connection areas is fixed.

11. A process according to claim 10, wherein the optical fiber sections are glued, using a bonding agent, in the area of the connections areas on a base.

12. A process according to claim 10, wherein the optical fiber sections are covered in the area of the connecting sections with a small tube which is glued together with the optical fiber sections.

13. A process according to claim 12, wherein the small tube is made of metal.

14. A process according to claim 12, wherein the small tube is made of glass.

15. A process according to claim 10, wherein the optical fiber sections are covered in the area of the connecting sections with two semitubes which are glued together with the optical fiber sections.

16. A fiber-optic depolarizer, comprising two polarization maintaining optical fiber sections connected with one another in such a manner that the main axes of the optical fiber sections are displaced by an angle of 45°; and a non-polarization-maintaining optical fiber section provided between the polarized optical fiber sections, wherein lengths L1 and L13 of the optical fiber sections are indicated by:

L1>LD and L3>LD and (L1−L3)>LD with $LD=LC*LB/\lambda$ wherein

LD is the depolization length,

LC is the coherence length,

LB is the beat length, and $\lambda$ is the center wave length of the light transmitted by means of the fiber arrangement.

17. A fiber-optic depolarizer according to claim 16, wherein the length of the non-polarization-maintaining optical fiber is in the range of 1 mm or to 3 cm.

* * * * *